United States Patent [19]
Oudet

[11] Patent Number: 5,444,313
[45] Date of Patent: Aug. 22, 1995

[54] ELECTROMAGNETIC ACTUATOR HAVING TWO OPPOSITE PHASE MOVABLE PARTS

[75] Inventor: Claude Oudet, Besancon, France

[73] Assignee: Moving Magnet Technologies S.A., Besancon, France

[21] Appl. No.: 170,264
[22] PCT Filed: May 4, 1993
[86] PCT No.: PCT/FR93/00429
§ 371 Date: Jul. 8, 1994
§ 102(e) Date: Jul. 8, 1994
[87] PCT Pub. No.: WO93/22821
PCT Pub. Date: Nov. 11, 1993

[30] Foreign Application Priority Data
May 4, 1992 [FR] France ............... 92 05465

[51] Int. Cl.$^6$ ............................................. H02K 33/06
[52] U.S. Cl. ........................................ 310/17; 310/15
[58] Field of Search ................. 310/15, 17, 36, 37, 310/38, 39

[56] References Cited

U.S. PATENT DOCUMENTS

| | | | |
|---|---|---|---|
| 3,764,834 | 10/1973 | Brosch et al. | 310/17 |
| 4,749,891 | 6/1988 | Sheng | 310/15 |
| 4,985,652 | 1/1991 | Oudet et al. | 310/15 |
| 5,136,194 | 8/1992 | Oudet et al. | 310/15 |
| 5,189,751 | 3/1993 | Giuliani et al. | 310/36 X |
| 5,298,825 | 3/1994 | Oudet et al. | 310/156 |
| 5,334,893 | 8/1994 | Oudet et al. | 310/38 |

FOREIGN PATENT DOCUMENTS

0909768  2/1982  U.S.S.R. ............... 310/15

*Primary Examiner*—Steven L. Stephan
*Assistant Examiner*—Judson H. Jones
*Attorney, Agent, or Firm*—Oblon, Spivak, McClelland, Maier & Neustadt

[57] ABSTRACT

Electromagnetic actuator comprising a stationary stator (I) with a central pole (3) of length $X_c$ and two lateral poles (4,5) of length $X_L$, said stator including an exciting coil (6). The actuator further comprises a moving part (2) with thin permanent magnets (12,13,22,23) magnetized in the direction of the air gap. It is characterized in that the moving member (2) consists of at least two independent elements (10,20) each movable in the parallel directions to the intersection of the air gap plane and the stationary stator median plane (1), in opposite directions. Each of the moving parts (10,29) has a pair of thin magnets (12,13,22,23) magnetized in alternate directions, integral with a yoke (11,21) of soft material. The thin magnets (22,23) of one of the moving elements (20) are magnetized in the opposite direction to the corresponding thin magnets (12,13) of the adjacent moving element (10), the yokes (11,21) defining with the stationary stator part the air gap (E).

10 Claims, 4 Drawing Sheets

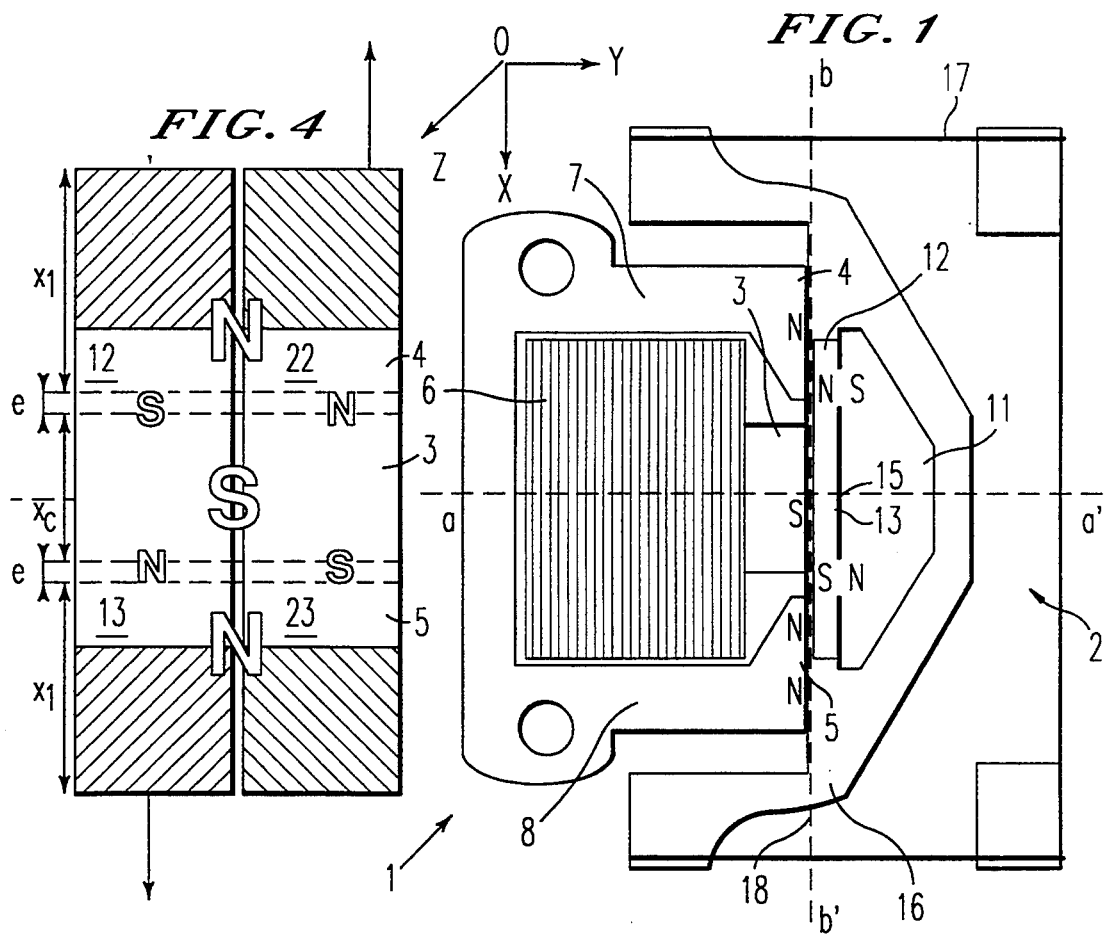
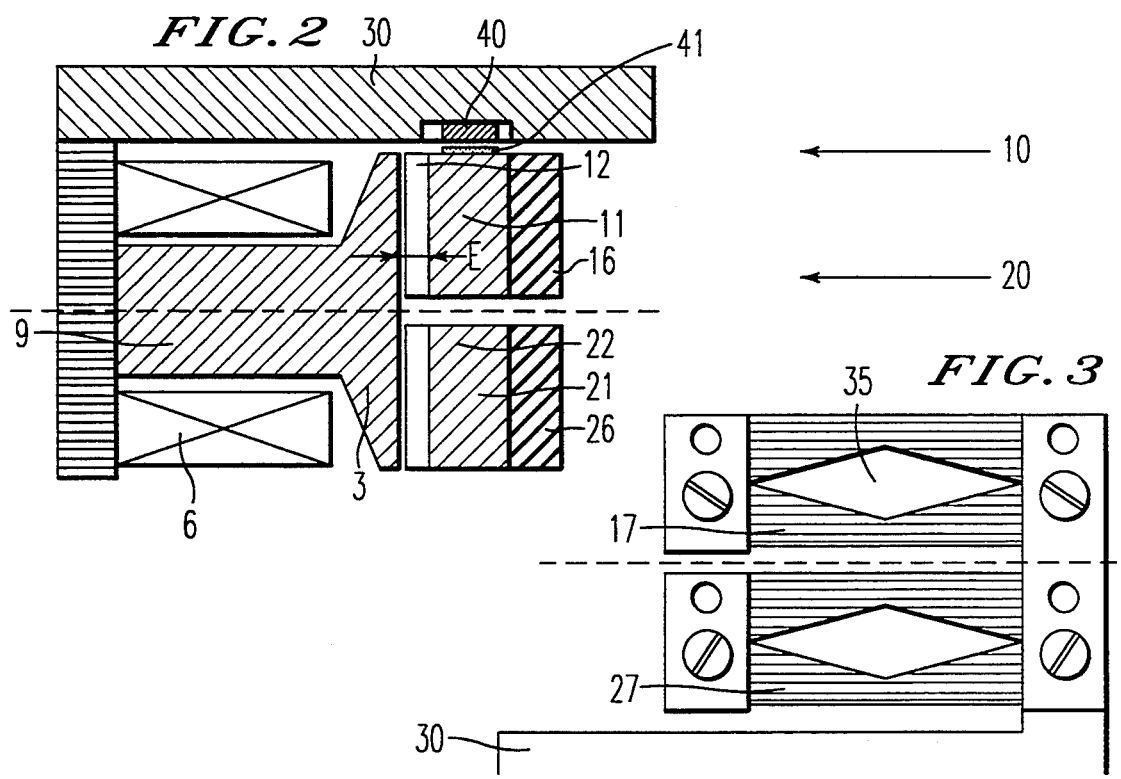

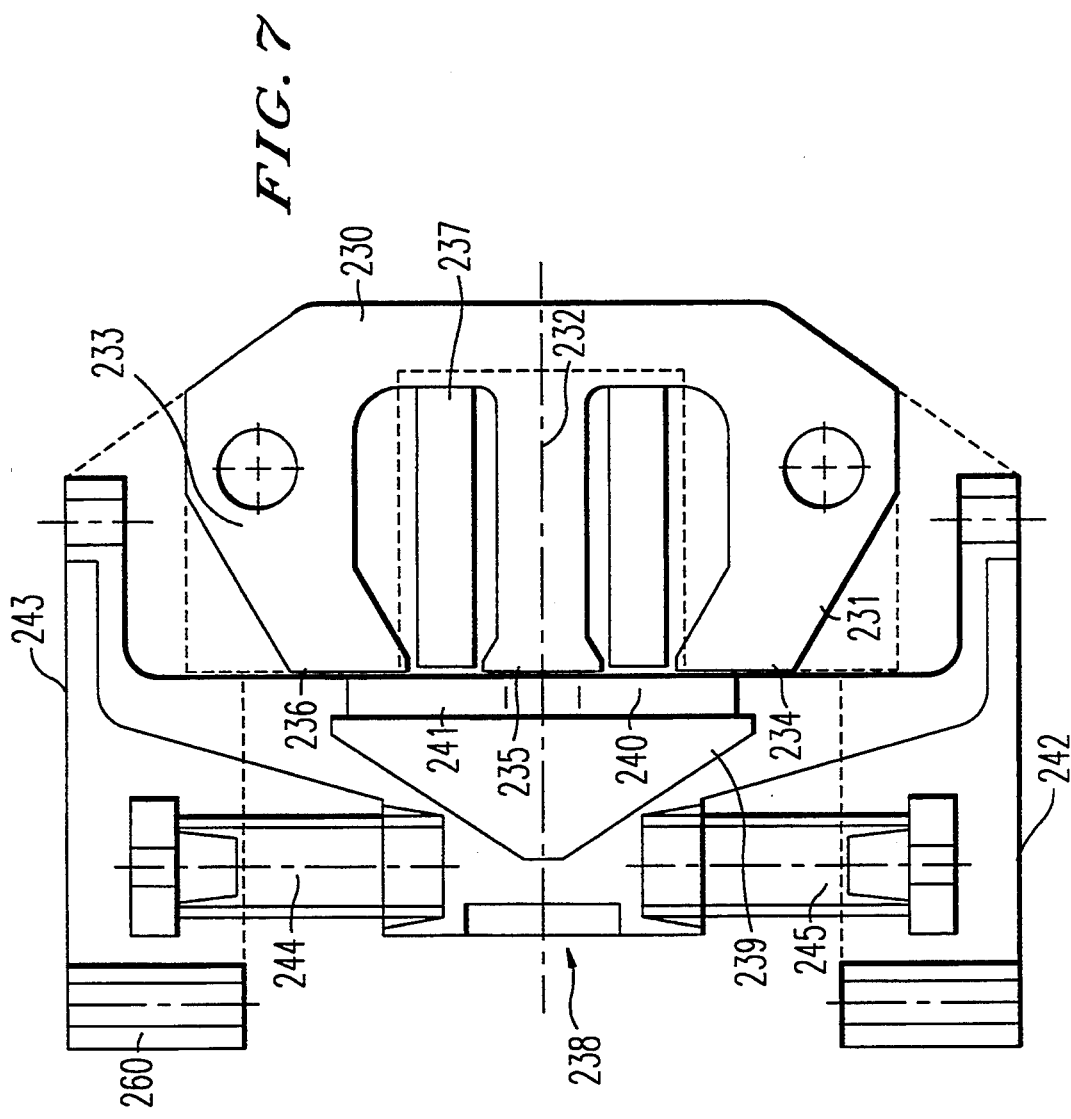

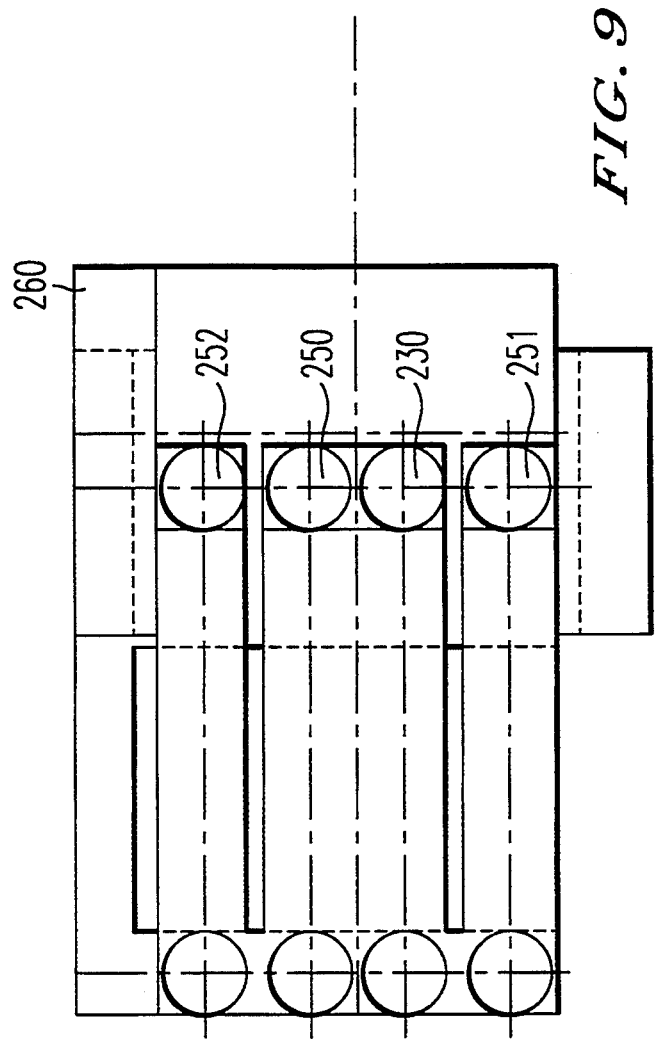

ELECTROMAGNETIC ACTUATOR HAVING TWO OPPOSITE PHASE MOVABLE PARTS

The present invention concerns an electromagnetic actuator comprising a central and two lateral poles. The central pole supports an exciter coil and a movable component fitted with thin permanent magnets magnetized in the direction of the air gap.

Prior art makes conventionally known vibrating motors of this type. To limit the vibrations transmitted to the frame supporting the stator, the French patent filed under No. 7213342 proposes suspending not only the rotor, but the stator as well. The vibrating actuator according to prior art thus incorporates two suspended weights whose characteristics (weight, stiffness of the suspension mechanisms) are specified so as to equalize the characteristic frequencies. However, these actuators are relatively fragile, given the complexity of the dual suspension system and the mobility of the stator, which requires, in particular, flexible electric linkages.

Prior art also includes U.S. Pat. No. 4,583,027, which describes a motor incorporating a single rotor driven in a vibratory motion which, by reaction, generates vibrations on the stator and its base.

Prior art further encompasses German Patent No. 2603681, which utilizes the activity of a magnetic field on a current. The rotor consists of a permanent magnet placed within the air gap. This motor does not make it possible to reach a satisfactory power level as measured in watts applied to the coil, since the functioning parts of the coil are those placed directly within the field produced by the magnets. The greater the thickness of copper desired, the more the field decreases, or the greater the thickness the magnets must posses, and, therefore, the greater the moving weight. Moreover, each magnet is attracted by the two stationary iron components, depending on its distance from each of them, and no means are provided in order to prevent the magnets from binding to one of them without hindering the motion sought.

The purpose of the invention is to produce a high-performance, reliable actuator for applications which require high-frequency alternating motion and which limit interference vibrations on the stator.

The mobile device belonging to the actuator according to the invention comprises at least two independent parts moving in opposite directions and in a direction parallel to the intersection of the plane of the air gap and the median plane of the fixed stator element. Each of the moving parts incorporates a pair of thin magnets magnetized in alternating directions and attached to a yoke made of a soft material, the thin magnets belonging to one of said moving parts being magnetized in the direction opposite that of the corresponding thin magnets belonging to the adjacent moving part, the yokes and the fixed stator element delineating the air gap E.

The actuator according to the invention allows optimal flow of the magnetic fluxes and makes it possible to maximize the stresses generated on the moving parts.

The motion of the moving parts is theoretically linear. The actuator according to the invention may also be produced in a cylindrical shape, the motion of the moving parts taking place, in this embodiment, along arcs of circles described on a cylinder coaxial to the cylindrical air gap.

In a first variant, the mobile device comprises two opposing moving elements of identical weights, each of these moving elements being connected to the fixed stator element by deformable means, in order to allow a swinging motion in the direction of mobility, while at the same time keeping a substantially constant air gap E. The quantified movement of one of the moving elements is identical in absolute value, and occurs in the direction opposite, to the quantified movement (product of the weight in relation to velocity) of the other moving element. Accordingly, the total quantified movement of the vibrating parts is nil, thereby making it possible to reduce appreciably the interference vibrations transmitted to the actuator support.

According to another variant, the mobile device comprises a central and two lateral parts, the weight of each of the lateral parts being equal to one-half of the weight of the central part, both the lateral and the central part being mobile in opposite directions and having a course of travel of the same amplitude, and each of said mobile parts being connected to the fixed stator by elastically-deformable means so as to permit a swinging motion in the direction of mobility, while maintaining a substantially-constant air gap E.

This embodiment makes it possible to cancel out not only the overall quantity of motion of the mobile device, but also the overall kinetic angular momentum of this device, and thus eliminates the residual vibratory moment of forces.

According to another variant intended to eliminate the residual vibratory moment of forces, the stator comprises two W-shaped parts, each of which incorporates a central pole having length $X_C$ and two lateral poles having length $X_L$, the actuator comprising two coils enclosing the central limbs, and the mobile device comprises at least two independent elements of identical weight, each of which moves in opposite directions parallel to the intersection of the plane of the air gap and of the median plane of the fixed stator, each of the moving parts incorporating a pair of thin magnets magnetized in alternating directions and attached to a yoke made of a soft material, this thin magnets of one of these moving parts being magnetized in the direction opposite to the corresponding thin magnets of the second moving part, the moving parts being aligned in the direction of mobility.

The linkage between each of the moving parts and the fixed stator is advantageously made by spring-leaves extending substantially perpendicularly to the plane of the air gap.

According to a preferred embodiment, the length $X_C$ of the central stator pole 3 and the length $X_1$ of the lateral stator poles 4, 5 are greater than, or equal to, the course of travel X of the mobile device, increased by a length substantially equal to E, $X_1$ being greater than, or equal to, $X_C$.

According to a preferred embodiment making it possible to increase the volume of copper without increasing the exterior dimensions of the actuator, the three stator poles are extended by a part whose cross-section is smaller than that of the poles. The sections of the parts thus formed are determined so as to allow the flow of the magnetic flux at the rated speed without saturation, the yokes 11, 21 incorporating a trapezoidal section, the large base corresponding to the contact surface with the permanent magnets.

The actuator according to the invention may be produced incorporating plane or axial symmetry. In the case of axial symmetry, the stator structure and the rotor are cylindrical. The rotor moves either in translational motion along a Y axis corresponding to the axis of curvature of the cylindrical stator structure and of the rotor, or in rotation around said axis. In this latter case, the overall structure matches the structure described in Patent No. 90 13 352 belonging to Applicant, in which coaxial mobile devices incorporating reversed magnetized elements should be substituted for the rotating device comprising the magnetized parts.

The central pole is preferably separated from the lateral Doles by a distance e greater than or equal to 0.5 E, where E designates the width of the air gap.

According to a specific embodiment, the mobile device further comprises at least one auxiliary magnet working in conjunction with an electric coil, so as to constitute a velocity sensor, and/or, in combination with a Hall probe, a position sensor.

A specific embodiment of the present invention is described hereinafter with reference to the drawings, in which:

FIG. 1 illustrates an embodiment of an actuator according to the invention, whose moving part is suspended on spring-leaves;

FIG. 2 is a view of said actuator along cross-section a—a';

FIG. 3 is a view of said actuator along the cross-section b—b';

FIG. 4 is a side view of the actuator according to the invention;

FIG. 7 is a front view of a second variant of the actuator according to the invention;

FIG. 8 is a top view of the actuator according to the second variant;

FIG. 9 is a side view of the actuator according to the second variant.

Figure 5:
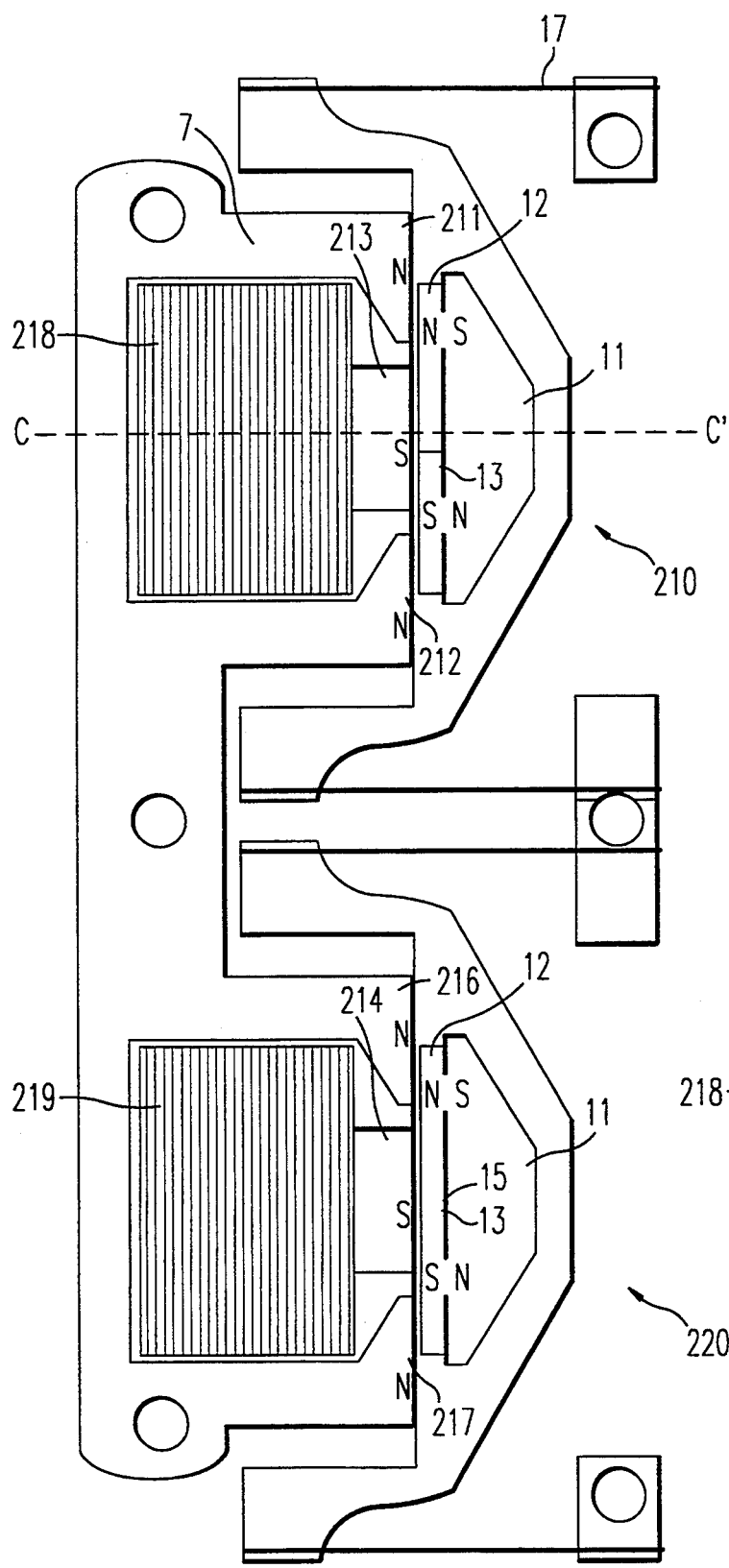
FIG. 5 is a side view of a first variant of the actuator according to the invention.

The actuator according to the invention, of which one embodiment is illustrated in FIG. 1, comprises a fixed stator 1 and a mobile device 2.

The stator 1 comprises a central stator pole 3 having length $X_c$ and two lateral stator poles 4, 5 having length $X_l$. The central stator pole 3 is enclosed by a coil 6. The stator is formed by a stack of plates cut from a magnetically soft material, e.g., laminated iron-silicon. The central stator pole 3 is laminated in a direction perpendicular to the plates making up the other parts of the stator.

The section of the limbs 7, 8 corresponding to the lateral magnetic poles 4, 5 respectively, is smaller than the surface areas of the corresponding lateral magnetic poles 4, 5 respectively, in order to clear a space sufficient for positioning the coil 6. Similarly, the section of the central limb 9 is smaller than the surface area of the central pole 3, as illustrated in FIG. 2.

The polarities of the stator poles indicated in FIG. 2 correspond to the phase in which the moving part 2 undergoes a stress in the direction OX. In the phase in which the moving part 2 moves in the opposite direction XO, the current applied to the coil is reversed, and thus the polarities of the stator poles are reversed in relation to those indicated on the attached drawings.

The section $S_j$ of the limbs is determined so as to limit $\phi_{max}/S_j$ to approximately 1.5 teslas, where $\phi_{max}$ designates the magnetic flux circulating inside the limbs according to the formula:

$$\phi = \left[ \frac{Br \frac{L}{\mu_r} + \mu_o ni}{\frac{L}{\mu_r} + (E - L)} \right] \cdot 2X$$

where $\mu r$ is the reversible permeability of the magnet;

X designates movement in relation to the middle position;

E designates the air gap between the lower surface 15 of the yoke 11 and the stator poles 3, 4, 5;

Z is the cumulative width of the two rotors as measured perpendicularly to their movement;

Br is the residual induction of the magnets;

L is the thickness of the magnets as measured in the direction of magnetization;

ni is the ampere-turns applied to the coil, and $\mu_o$ is the permeability of the void.

The mobile device 2 comprises two parts 10, 20 which move along the axis OX in alternating directions.

The moving part 10, which can been seen in front view in FIG. 1 and in cross-section in FIG. 2, is formed by a trapezoidal yoke 11 made of a soft material, on the lower surface of which two thin magnets 12, 3 are bonded. These thin magnets are magnetized in alternating directions in the direction of their thickness. The magnets are preferably rare earth magnets, such as magnets made of samarium-cobalt $SmCo_5$ or of neodymium-iron-boron NdFeB.

The length $X_a$ of each of the magnets 12, 13 is substantially equal to C+2E, C being the course of travel of the moving part 10. Their thickness L is approximately 1 millimeter, giving a value of nI of less than 300 ampere-turns.

The length of the yoke may be greater than the cumulative length $2X_a$ of the two magnets 12, 13 and is approximately equal to $2X_a+E$ in the example shown.

The yoke 11 and the magnets 12, 13 are encapsulated in a block 16 of a non-magnetic material. To delineate an air gap E, the moving part 10 should be kept at a slight distance from the surface of the stator poles 3, 4, 5 during the entire functional course of travel C. This function may be carried out using a deformable or an elastic connection. In the example cited in reference, this function is accomplished by virtue of spring-leaves 17, 18 working under alternating flexion with superposition of a tractive stress linked to the absolute average value of the induction in the air gap, these spring-leaves being made of spring steel, such as Phynox (trade name), and extending perpendicularly to the plane of the permanent magnets 12, 13. To stretch toward the so-called equal-stress leaves, the spring-leaves incorporate rhombic-shaped recesses 25, as illustrated in FIG. 4.

The length and the thickness of the spring-leaves 17, 18 are determined so as to keep the moving parts 10, 20 at the proper distance from the stator, to withstand the stress resulting from movement, and, potentially, to set the resonant frequency of the moving part. To better withstand fatigue due to alternating flexion, several leaves can be arranged in parallel.

The length $L_r$ of the spring-leaves 17, 18 may, moreover, be determined so as to be sufficient to ensure that the movements of the moving part 10 along an axis perpendicular to the plane of the permanent magnets 12, 13 will be negligible for the course of travel C.

The geometry of the air gap may be modified so as to increase or reduce magnetic stiffness and to obtain an effect similar to that obtained by modifying the stiffness of the suspension springs, in order to reduce the stresses generated on the spring-leaves, without changing the characteristic frequency.

When the spring-leaf is long, the variations of the air gap between the end of the course of travel and the central position are minimized and give a low magnetic stiffness. In this case, the characteristic frequency of the moving part is basically determined by the characteristics of the spring-leaves, and, in particular, by their mechanical stiffness.

On the other hand, when the spring-leaves are short, the distance between the surface of the magnets 12, 13 and the polar surfaces of the first stator element varies substantially between the central position and the position in which the moving part reaches the end of the course of travel. This variation of the air gap produces a force effect in the absence of current tending to bring the moving part back to rest in the centered position. The characteristic frequency of the moving part 25 is thus substantially increased by the magnetic stiffness thus obtained.

The second moving part 20 is identical to the first moving part 10, except for the fact that the magnets 22, 23 are magnetized in directions opposite to the adjacent magnets of the first moving part 10, when both are in the centered resting position in relation to the central stator pole 3.

The two moving parts move in opposition, because of the reversal of the polarities of the magnets 12, 13 and 22, 23.

It should be noted that the use of two vibrating moving parts in phase opposition makes it possible to reduce the flux circulating through the lateral limbs. This makes it possible to decrease magnetic losses, and thus to reduce the space and weight of the stator.

FIG. 5 is a side view of an actuator according to a variant allowing elimination of the vibrating interference moment of forces by compensation of the kinetic angular moments of the two moving parts 210, 220 making up the mobile device.

The actuator comprises a stator comprising a part incorporating six limbs forming six magnetic poles 211 to 217. The overall stator structure according to this variant corresponds to the on-line combination of two stators, in accordance with the embodiment described with reference to FIGS. 1 to 4.

Figure 6:
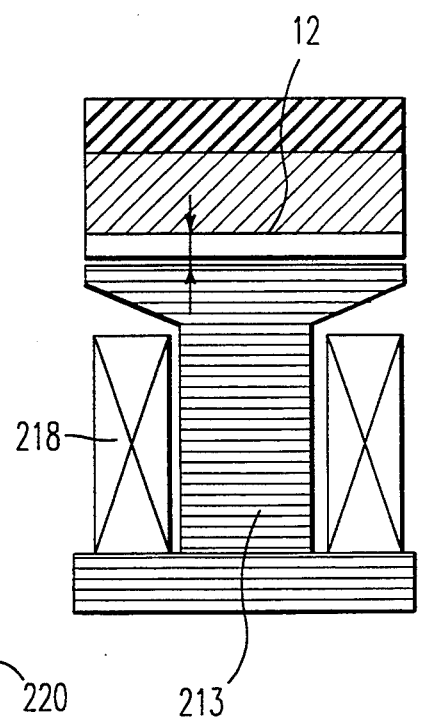
FIG. 6 illustrates the actuator along cross-section c—c'.

Each of the central limbs 213, 214 is enclosed by a coil 218, 219. These coils are powered so as to drive, in each phase, the movement of the corresponding moving part 210, 220 in opposite directions. In the example described with reference to FIG. 5, the coils are fed in FIG. 6 is a cross-sectional plane view along C—C' passing through the central limb 213 and one of the magnets 12. The moving parts 210, 220 incorporate only a single pair of thin magnets 12, 13 aligned along the axis of movement of the moving parts.

FIG. 7 and 9 illustrate a second embodiment in a front, top, and side view, respectively.

As in the first variant described with reference to FIGS. 1 to 4, the stator comprises a W-shaped part 230 made of a soft material incorporating two lateral limbs 231, 233 and a central limb 232, each of which delineates stator poles 234, 236, 235.

A coil 237 encloses the central limb. The transverse cross-section of the central limb 232 is smaller than the section of the central pole 235, in order, first, to make it possible to arrange several wire turns making it possible to pick up a signal proportional to the velocity of the moving parts, and second, in combination with the design of the lateral limbs 230, 231, to reduce the leakage flux appearing in the high induction slot.

The mobile device 238 is formed by a yoke 239 having a trapezoidal section and thin permanent magnets 240, 241.

The mobile device 238 is suspended byplates 242, 243. Springs 244 to 245 produce the main portion of the stiffness needed to ensure that the two rotors vibrate in phase opposition at the desired frequency.

The mobile device is shown in a half-top view in FIG. 8. It comprises a central moving part 250 and two lateral moving parts 251, 252. Each of the moving parts 250 to 252 consists of a trapezoidal yoke to which two thin magnets are fastened. The width of the central moving part 250 equals twice the width of each of the lateral elements 251, 252, and, therefore, the volume, and thus the weight of the central moving part 250 equals twice the volume, and, in consequence, the weight of the lateral parts 251, 252. These two lateral parts 251, 252 are connected by a coupling bar 260.

FIG. 9 is a side view of the actuator. The stator 230 supports at each end a reversed L-shaped base 260 to which are fastened the suspension plates 262 to 265 designed for positioning the central moving part 252 and the lateral moving parts 250, 251.

The present invention is not restricted to the embodiment described above. Many variants can be contemplated.

I claim:

1. Electromagnetic actuator comprising a fixed stator (1) comprising at least one exciter coil (6), the actuator further comprising a moving part (2) fitted with thin permanent magnets magnetized in the direction of the air gap, wherein the stator incorporates at least one W-shaped part, said stator comprising a central pole (3) having length $X_C$ and two lateral poles (4, having length $X_L$, the coil enclosing the central limb, and wherein said mobile device (2) consists of at least two independent components (10, 20) each moving in directions parallel to the intersection of the plane of the air gap and of the median plane the fixed stator (1) and in opposite directions, each of said moving parts (10, 20) incorporating a pair of thin magnets (12, 13; 22, 23) magnetized in alternating directions and fastened to a yoke (11, 21) made of a soft material, the thin magnets (22, 23) of one of said moving parts (20) being magnetized in the direction opposite to the corresponding thin magnets (12, 13) belonging to the adjacent moving part (10), the yokes (11, 21) and the stator delineating the air gap E.

2. Electromagnetic actuator according to claim 1, wherein the mobile device (2) consists of two parts (10, 20) moving in opposition, each of said moving parts (10, 20) being connected to the fixed stator (1) by elastically-deformable means, so as to permit a swinging motion in the direction of mobility, while maintaining a uniform air gap E, the two parts (10, 20) having identical weight and a course of travel of the same amplitude.

3. Electromagnetic actuator according to either of the two preceding claims, wherein the mobile device consists of a central part (250) and two lateral parts (251, 252), the weight of each of said lateral parts (251, 252) being equal to one-half of the weight of the central part (250), the lateral parts (251, 252) and the central part moving in opposite directions and having a course of travel of the same amplitude, each of said moving parts (250, 251, 252) being connected to the fixed stator (1) by elastically-deformable means, so as to allow a swinging motion in the direction of mobility, while maintaining a substantially-uniform air gap E.

4. Electromagnetic actuator according to either of claims 1 and 2, wherein the stator consists of two W-shaped parts, each of which incorporates a central pole (213, 214) having length $X_C$ and two lateral poles (211, 212, 216, 217) having length $X_L$, said actuator comprising two coils (218, 219) enclosing the central limbs (213, 214), and wherein the mobile device (2) consists of at least two independent parts (210, 220) of identical weight, each of which moves in directions parallel to the intersection of the plane of the air gap and of the median plane of the fixed stator (201) and in opposite directions, each of the moving parts (210, 220) incorporating a pair of thin magnets (212, 213; 22, 223) magnetized in alternating directions and attached to a yoke (211) made of a soft material, the thin magnets (222, 223) belonging to one of the moving parts (220) being magnetized in the direction opposite the corresponding thin magnets (212, 213) belonging to the second moving part (210), the moving parts (210, 220) being aligned in the direction of mobility.

5. Electromagnetic actuator according to any of the preceding claims, wherein the connection between each of the moving parts (10, 20) and the stationary stator (1) is produced by spring-leaves (17, 18, 27, 28) extending substantially perpendicularly to the plane of the air gap.

6. Electromagnetic actuator according to any of the preceding claims, wherein the length $X_C$ of the central stator pole (3) and the length $X_l$ of the lateral stator poles (4, 5) are greater than or equal to the course of travel x of the mobile device, increased by a length substantially equal to E, $X_l$ being greater than or equal to $X_c$.

7. Electromagnetic actuator according to any of the preceding claims, wherein the section of the central core (9) supporting the coil (6) and the sections of the lateral limbs (7, 8) are smaller than the section of the corresponding stator pole.

8. Electromagnetic actuator according to any of the preceding claims, wherein the distance e separating the central pole and each of the lateral poles is greater than or equal to 0.5 E, where E is the width of the air gap.

9. Electromagnetic actuator according to any of the preceding claims, wherein the yokes (11, 21) incorporate a trapezoidal section, the large base corresponding to the contact surface with the permanent magnets.

10. Electromagnetic actuator according to any of the preceding claims, wherein the mobile device further comprises at least one auxiliary magnet working in conjunction with an electric coil in order to form a velocity sensor, and/or, in combination with a Hall probe, to form a position sensor.

* * * * *